United States Patent [19]

Fogelberg

[11] 4,300,667
[45] Nov. 17, 1981

[54] AUTOMATIC LOCKING CLUTCH

[75] Inventor: Mark J. Fogelberg, Muncie, Ind.

[73] Assignee: Borg-Warner Corporation, Chicago, Ill.

[21] Appl. No.: 49,004

[22] Filed: Jun. 15, 1979

Related U.S. Application Data

[63] Continuation of Ser. No. 868,587, Jan. 11, 1978, abandoned.

[51] Int. Cl.³ .................... F16D 11/00; B60K 17/34
[52] U.S. Cl. .................... 192/36; 180/247; 192/49; 192/67 R; 192/93 A
[58] Field of Search .............. 192/34, 36, 49, 50, 192/67 R, 93 A; 180/247

[56] References Cited

U.S. PATENT DOCUMENTS

| | | | |
|---|---|---|---|
| 2,888,114 | 5/1959 | Bostock | 192/49 X |
| 3,217,847 | 11/1965 | Petrak | 192/93 A X |
| 3,651,906 | 3/1972 | Slator | 192/35 |
| 3,656,598 | 4/1972 | Goble | 192/35 |
| 4,163,486 | 8/1979 | Kagata | 192/67 R X |
| 4,192,411 | 3/1980 | Fogelberg | 192/49 |

*Primary Examiner*—Allan D. Herrmann
*Attorney, Agent, or Firm*—Julian Schachner

[57] ABSTRACT

A clutch for engaging a driving member with a driven member automatically upon application of torque to rotate the driving member in either direction, for maintaining engagement in either the drive or coast mode of operation and during the transition between drive and coast, for maintaining engagement in either forward or reverse operation and during the transition between forward and reverse, and for disengaging automatically upon interruption of the torque and slight rotation of the driving member in the opposite direction. The clutch includes a mechanism for developing high frictional drag upon initial rotation of the driving member to effect clutch engagement, and low frictional drag thereafter to conserve power.

13 Claims, 8 Drawing Figures

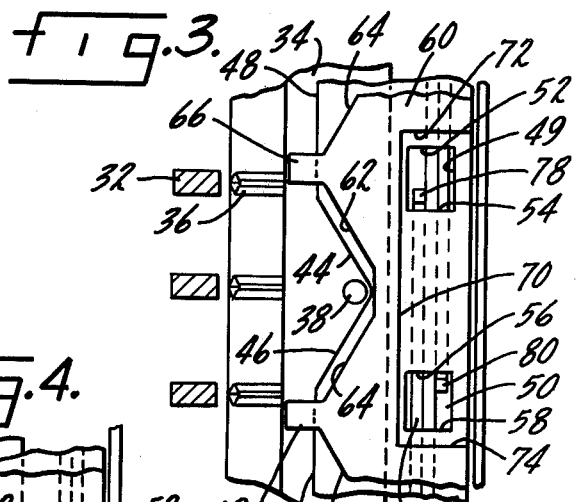

AUTOMATIC LOCKING CLUTCH

This is a continuation of application Ser. No. 868,587 filed Jan. 11, 1978, now abandoned.

BACKGROUND OF THE INVENTION

This invention relates generally to clutches. More particularly, it relates to a clutch for use in effecting locking engagement between a front drive axle and a front wheel of a four-wheel drive vehicle in response to the application of power to the front drive axle. The clutch automatically effects disengagement upon cessation of the application of power to the front drive axle, together with a direction reversal thereof.

Heretofore, various clutching mechanisms have been used for engaging a front drive axle with its associated wheels in a four-wheel drive vehicle. One such mechanism normally is disengaged to allow the wheels to rotate independently of the front drive system. This requires that the operator lock each clutch manually to engage the front drive axle and wheels, and to unlock them manually to disengage.

Another such mechansim provides an overrunning clutch which engages automatically when power is applied to the front drive axle and when operation is in the drive mode. However, such an overrunning clutch disengages automatically upon operation in the coast mode. In other words, the overrunning clutch engages when the rotational speed of the axle tends to exceed the rotational speed of the wheel, but disengages when the rotational speed of the wheel tends to exceed that of the axle. Such overrunning clutches generally provide some means by which the operator may override manually to insure locking engagement between the axle and wheels.

Yet another such mechanism provides a clutch which operates in response to the application of torque to the front drive axle to move pins into slots so as to engage the axle with its associated wheels. Although a mechanism of this type will effect engagement in either the drive or coast mode of operation, there is the possibility that the pins will slip out of the slots during movement between drive and coast, in which case the clutch would disengage and then re-engage automatically. At normal operating speeds such disengagement and re-engagement could cause severe shocks to the clutch components and, indeed, to the entire front driveline. This would result in a dangerous and possibly destructive condition. Further, in a float condition wherein the axle is rotating but no torque is transferred between the axle and wheels, an inadvertent tendency for movement between the drive and coast modes of operation could develop. This could cause the clutch to disengage and then re-engage, and establish the same dangerous condition.

U.S. Application Ser. No. 799,793 filed May 23, 1977 is directed to an automatic locking clutch which overcomes the deficiencies of the prior devices. As disclosed therein, the clutch will automatically engage a front drive axle and an associated wheel in response to engagement of the front-wheel drive system, will maintain engagement positively in the drive and coast modes of operation as well as during the transition between drive and coast, will maintain engagement positively in forward and reverse operation as well as during the transition between forward and reverse, and will disengage automatically when the front-drive system is disengaged.

The automatic locking clutch includes a ring for developing frictional drag sufficiently high to cause clutch engagement. Thereafter, this high drag continues, although it is not required to maintain engagement. Thus, in order to conserve power, reduce heat, ease the problems of material selection, etc., there remains a need for an automatic locking clutch of this type which will develop relatively high frictional drag initially to effect automatic clutch engagement, and which will develop relatively low frictional drag thereafter.

SUMMARY OF THE INVENTION

A primary object of this invention is to provide an improved automatic clutch which will meet the need noted above. The invention is directed to an improved clutch for automatically effecting engagement between driving and driven members in response to rotation of the driving member. The clutch maintains positive engagement between the members so long as the driving member rotates, and disengages automatically when rotation of the driving member is discontinued. The clutch of the present invention is adapted for use in four-wheel drive vehicles where it is desirable to provide automatic engagement of the front wheels when the operator engages the front-wheel drive system. The clutch is operative when the vehicle is engaged in forward or reverse, and maintains engagement positively until the operator shifts out of four-wheel drive and reverses direction.

The clutch of this invention includes a movable clutching sleeve associated with a driving member and a fixed clutching sleeve associated with a driven member. The movable clutching sleeve is positively cammed into locking engagement with the fixed clutching sleeve upon rotation of the driving member. A blocking device prevents inadvertent disengagement of the clutching sleeves in the event of a tendency for the driven member to overrun the driving member. As a result, the positive locking relationship is maintained in the drive and coast modes of operation as well as during transition between drive and coast. Furthermore, the arrangement is such that engagement is maintained when the driving member is rotated in forward or reverse as well as during transition between forward and reverse drive.

The clutch of this invention also includes an improved mechanism for developing a frictional drag force to cause camming of the movable clutching sleeve. The mechanism incorporates a wrapped spring type of clutch characterized as having relatively high resistance to slippage in the spring tightening or wrapping direction, and relatively low resistance to slippage in the spring loosening or unwrapping direction. Upon initial rotation of the driving member, the spring is caused to tighten, thereby causing camming of the movable clutch sleeve. After camming is completed, the spring is caused to loosen, thereby reducing frictional drag to a minimum.

BRIEF DESCRIPTION OF THE DRAWINGS

The objects and advantages of this invention will become apparent to those skilled in the art upon careful consideration of the specification herein, including the drawings, wherein:

FIG. 3 is a developed view taken along the line 3—3 of FIG. 1 showing the clutch in its disengaged position;

FIG. 4 is a developed view similar to FIG. 3 showing the clutch at an initial stage of movement toward its forward drive position;

FIG. 5 is a developed view similar to FIG. 3 showing the clutch at a later stage of movement toward its forward drive position;

FIG. 6 is a developed view similar to FIG. 3 showing the clutch in its forward drive position;

FIG. 7 is a developed view similar to FIG. 3 showing the clutch in its reverse drive position.

Figure 1:
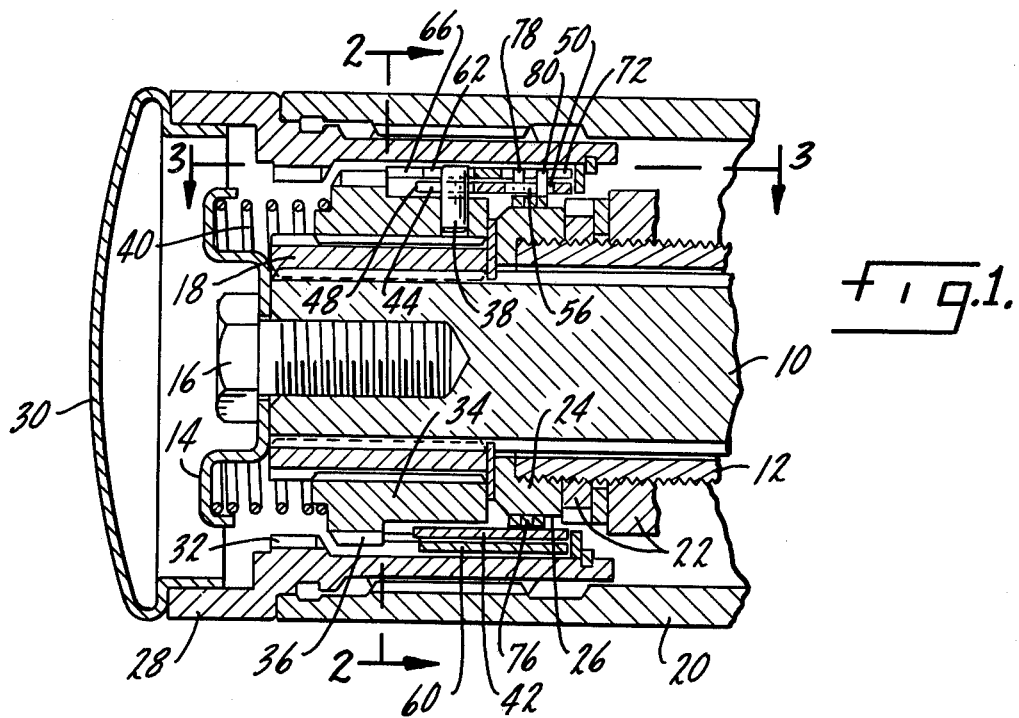
FIG. 1 is a sectional view showing details of the improved automatic locking clutch.

While this invention is susceptible of embodiment in many different forms, there is shown in the drawings and herein will be described in detail a preferred embodiment. It should be understood that the present disclosure is considered to be an exemplification of the principles of the invention and is not intended to limit the invention to this embodiment.

DESCRIPTION OF A PREFERRED EMBODIMENT

Figures 2, 8:
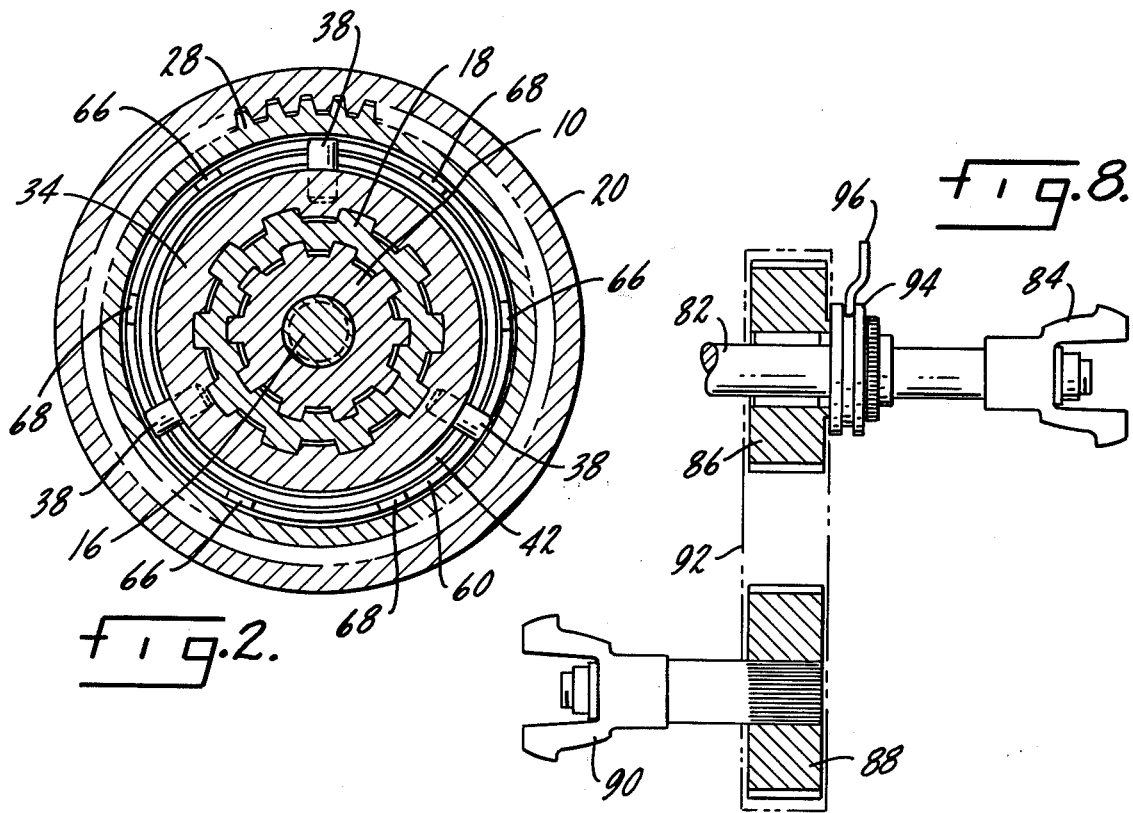
FIG. 2 is a sectional view taken along the line 2—2 of FIG. 1 showing additional details of the clutch.
FIG. 8 is a schematic view showing an associated transfer case for use in conjunction with the clutch.

Referring to the drawings now in greater detail, and with particular reference to FIGS. 1, 2, and 3, there is shown a driving member or shaft 10, which in one preferred form of the invention is the front axle of a four-wheel drive vehicle. Axle 10 is rotatably supported in a conventional manner within an axle housing 12. Axle 10 extends outwardly beyond the spindle of housing 12, and a spring retainer 14 is secured to the outer end thereof by a bolt 16 or the like. A collar 18 is secured to axle 10 for rotation therewith, and is located between the spindle of housing 12 and spring retainer 14.

A driven member 20, which in one preferred form of the invention is the front wheel hub of a four-wheel drive vehicle, is supported by a conventional bearing, not shown, for rotation about housing 12. Lock nuts 22 secure this bearing in the usual manner. An end nut 24 is fastened to the spindle of housing 12 and defines a smooth cylindrical surface 26.

A hub extension sleeve 28 is secured to wheel hub 20 for rotation therewith. Hub extension 28 extends outwardly beyond spring retainer 14 and bolt 16, and a suitable cap 30 closes its outer end. Hub extension 28 defines a plurality of clutch teeth 32.

An axle clutch sleeve 34 is splined to collar 18 for rotation therewith and sliding movement relative thereto. Sleeve 34 defines a plurality of clutch teeth 36 adapted for meshing engagement with teeth 32 of hub extension 28. Sleeve 34 also defines a plurality of cam followers in the form of outwardly radially extending pins 38. A suitable spring 40 reacts against spring retainer 14 and biases sleeve 34 inwardly such that teeth 36 normally are out of meshing engagement with teeth 32.

An annular cam 42 is spaced from the spindle of housing 12 and from sleeve 34 so as to be rotatable relative thereto. Cam 42 defines a plurality of pairs of outwardly diverging ramp surface portions 44 and 46, each pair being connected by a flat surface portion 48. A pin 38 is cooperable with each pair of ramp surface portions 44 and 46. Cam 42 also defines a pair of spaced slots 49 and 50 in alignment with cylindrical surface 26 of nut 24. Slot 49 is partially defined by surfaces 52 and 54, and slot 50 by surfaces 56 and 58 of cam 42.

An annular stop member 60 is concentric with cam 42. Member 60 defines a plurality of pairs of outwardly diverging surfaces 62 and 64 parallel to but spaced farther apart than surfaces 44 and 46 of cam 42. Surfaces 62 and 64 terminate in outwardly extending projections 66 and 68. Projection 66 and 68 respectively extend outwardly beyond flat surface 48 of cam 42 adjacent the junction with ramp surfaces 44 and 46. Member 60 also defines a notch 70 in alignment with slots 49-50 of cam 42, and with surface 26 of nut 24. Notch 70 is partially defined by surfaces 72 and 74 of member 60 such that notch 70 extends beyond slots 49-50 with surfaces 72 and 74 spaced farther apart than surfaces 52 and 58 of cam 42.

A friction drag mechanism of the wrapped spring clutch type includes a multi-turn drag spring 76 wrapped around cylindrical surface 26 of nut 24 with a slight interference fit so that some residual frictional drag force is developed therebetween. Spring 76 has ends 78 and 80 respectively extending radially through slots 49 and 50 of cam 42 and into notch 70 of member 60. In the disengaged position shown in FIG. 3, spring ends 78 and 80 are spaced from surfaces 54 and 56, respectively. With pins 38 and ramp surfaces 44-46 in the position shown in FIG. 3, sleeve 34 is in the position shown in FIG. 1. Teeth 32 and 36 are out of mesh, and wheel hub 20 rotates freely about axle 10, which is stationary when the associated vehicle is in two-wheel drive.

When the operator desires to establish four-wheel drive, he directs power to axle 10. Collar 18 and sleeve 34 rotate with axle 10. Assuming that forward rotation of axle 10 results in downward movement of sleeve 34, as shown in FIG. 3, pins 38 will abut ramp surfaces 46 and drive cam 42 downwardly, as shown in FIG. 4. Surface 56 will abut spring end 80 and carry spring 76 around surface 26 of nut 24. As spring 76 tightens, or tends to wrap around surface 26, the frictional drag force tending to retard downward movement of cam 42 is increased, and a relatively high frictional drag results. Pins 38 move up ramp surfaces 46 to the position shown in FIG. 5, thereby sliding sleeve 34 outwardly until teeth 36 are in alignment with teeth 32. Pins 38 abut projections 68 and drive member 60 downwardly as they move along flat surface 48 to the position shown in FIG. 6. Cam 42 no longer is driven by pins 38. However, surface 72 of member 60 abuts spring end 78, moving it downwardly into abutment with surface 54 of cam 42. Spring end 80 is moved downwardly away from surface 56, and spring 76 loosens, or tends to unwrap around surface 26. The frictional drag force tending to retard downward movement of member 60 is decreased, and a relatively low frictional drag results. Cam 42 also is carried downwardly with very little energy loss, heat buildup, etc.

Sleeve 34 is moved outwardly against the biasing force of spring 40 from the position shown in FIG. 3 to the position shown in FIG. 6. Teeth 36 are moved outwardly into alignment with teeth 32, and positive engagement is established between axle 10 and wheel hub 20 in the drive mode. Teeth 32 and 36 are constructed such that the backlash therebetween is smaller than the distance between pins 38 and the top of ramp surfaces 46 along flat surface 48.

When the vehicle shifts from drive to coast, as for example when the operator lifts his foot off of the accelerator, hub 20 tends to overrun axle 10. In this condition teeth 32 shift from the full-line position shown in FIG. 6 to the dotted-line position of FIG. 6. In effect, an engine braking condition is established, and hub 20 drives axle 10. Pins 38 continue to abut projections 68, and member 60 continues to carry cam 42 through spring end 78. Spring 76 continues to loosen, and frictional drag remains relatively low. The vehicle may shift back and forth between drive and coast, but teeth 32 and 36 will remain in meshing alignment, thus ensuring that four-wheel drive operation is maintained.

When the operator desires to move in reverse, he stops the vehicle, shifts the transmission into reverse, and then starts the vehicle once again, all the while remaining in four-wheel drive. Because the backlash between teeth 32 and 36 is smaller than the distance between pins 38 and the top of ramp surfaces 46, tooth contact is established before pins 38 start to ride down ramps 46. Sufficient pressure is established between teeth 32 and 36 such that sleeve 34 is held against the biasing force of spring 40. Pins 38 move directly from the position shown in FIG. 6 to the position shown in FIG. 7, in which they abut projections 66. Pins 38 do not ride down ramps 46 and up rams 44, due to the windup in teeth 32 and 36. Four-wheel drive operation is maintained. When in reverse, the vehicle may shift between the drive and coast modes while remaining positively engaged for four-wheel drive operation.

An important advantage of the arrangement disclosed herein is that a positive drive condition is maintained in both the drive and the coast modes, either in forward or reverse. This positive drive is established automatically, thereby eliminating any need for manually locking the wheel hubs.

When the operator desires to establish two-wheel drive, he stops the vehicle, discontinues the transfer of power to axle 10, and moves the vehicle in the opposite direction slightly to relieve the windup in teeth 32 and 36, and to bring pins 38 into contact with either ramps 44 or 46. Spring 40 biases sleeve 34 inwardly to the position shown in FIGS. 1 and 3. The operator may then proceed in either direction in two-wheel drive.

In one preferred form of the invention, direct drive may be established from an engine to a rear drive axle, for example, with offset drive being established to a front drive axle, for example. As shown in FIG. 8, such an arrangement includes a transfer case having an input 82 adapted to receive power from the transmission of a four-wheel drive vehicle. A rear output 84 is connected directly to input 82, and is connected through a rear propeller shaft to the rear axle. A sprocket 86 is journalled for rotation relative to input 82, and a complimentary sprocket 88 is secured to a front output 90 which is connected through a front propeller shaft to front axle 10. A suitable chain 92 couples sprokets 86 and 88 for power transfer therebetween. A clutch 94 is controllable by the vehicle operator through a suitable acutating mechanism 96. In one position, clutch 94 disengages sprocket 86 from input 82 such that power is transferred from input 82 to output 84, but not to output 90. Two-wheel drive is established. In another position, clutch 94 engages sprocket 86 with input 82 such that power is transferred from input 82 to both outputs 84 and 90. With clutch 94 engaged and power transferred to output 90, front axle 10 rotates and four-wheel drive is established automatically.

Thus it will be seen that positive drive is established automatically in both the drive and coast modes of operation when four-wheel drive is engaged. The automatic feature eliminates any necessity for manual lock-up in order to insure positive drive. The automatic feature maintains four-wheel drive in either the drive or coast modes, and during the transition between drive and coast. Similarly, four-wheel drive is maintained in either forward or reverse operation, and during the shift between forward and reverse.

A friction clutch incorporating a drag spring is arranged to develop a relatively high frictional drag force which is used to cam the automatic locking clutch into engagement. The drag spring is arranged to develop a relatively low frictional drag force after automatic clutch engagement.

It should be apparent that although the invention provides a novel arrangement for clutching the front drive axle and its associated wheels in a four-wheel drive vehicle, it is readily available for use in any environment where automatic clutching between driving and driven members is desired.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. In a clutch for effecting engagement between rotatable driving and driven members in response to rotation of the driving member, said clutch incorporating first and second clutching means respectively rotatable with said driving and driven members, said first clutching means being movable relative to the driving member into and out of engagement with said second clutching means, means yieldably biasing said first clutching means away from engagement with said second clutching means, and actuating means for said clutch; the improvement wherein said actuating means comprises rotatable cam means, means responsive to rotation of the driving member for developing relatively high and low forces tending to retard rotation of said cam means, means for rotating said cam means with said first clutching means in opposition to said relatively high force, cam follower means cooperable with said cam means for moving said first clutching means toward engagement with said second clutching means in response to said rotation of said cam means in opposition to said relatively high force, said force developing means being constructed and arranged to develop said relatively low force when said first and second clutching means are in engagement, and means for rotating said cam means with said first clutching means in opposition to said relatively low force when said first and second clutching means are in engagement.

2. The invention of claim 1, said first clutching means defining said cam follower means.

3. The invention of claim 2, said actuating means and said force developing means defining said cam rotating means.

4. An automatic clutch disposed for selective engagement of a first member with a second member upon rotation of the first member, said clutch comprising first clutch means secured to the first member for rotation therewith and movement relative thereto, said first clutch means defining a first set of clutch teeth and a cam follower, second clutch means secured to the second member for rotation therewith, said second clutch means defining a second set of clutch teeth, said first and second sets of clutch teeth being adapted for meshing engagement in drive and coast mdoes when in alignment, resilient means biasing said first clutch means away from said second clutch means such that said first and second sets of clutch teeth are out of alignment, a cam rotatable upon rotation of the first member, and friction means tending to retard rotation of said cam upon initial rotation of the first member, said first clutch means being cammed toward said second clutch means by said cam in response to retarded rotation thereof such that said first set of clutch teeth is moved into alignment with said second set of clutch teeth, continued rotation the first member reducing the rotation retarding tendency of said friction means.

5. The invention of claim 4, said cam being rotatable with said first clutch means as said clutch teeth move between meshing engagement in the drive mode and meshing engagement in the coast mode.

6. The invention of claim 5, said first clutch means being rotatable relative to said cam for a predetermined distance in response to a reversal of the direction of rotation of said first member, said cam being rotatable with said first clutch means in the reverse direction thereafter.

7. The invention of claim 6, said clutch teeth when in meshing engagement tending to develop sufficient force to overcome the force of said resilient means and prevent said first clutch means from moving away from said second clutch means.

8. A clutch for automatically engaging and disengaging an inner drive axle and an outer wheel hub wherein the axle is rotatable in a stationary axle housing, said clutch comprising a first clutch sleeve disposed on the axle for rotation therewith, said first clutch sleeve having a first set of teeth, a second clutch sleeve connected to the hub for rotation therewith, said second clutch sleeve having a second set of teeth, said first and second sets of teeth being adapted for meshing engagement in drive and coast modes, a rotatable cam, said cam defining a ramp surface and a flat surface, a rotatable stop member, spring means in frictional contact with said housing and movable relative thereto for developing friction drag, said spring means being movable by said cam to thereby develop relatively high friction drag, said spring means being movable by said stop member to thereby develop relatively low friction drag, and resilient means biasing said first clutch sleeve such that said first and second sets of teeth are out of meshing engagement, said first clutch sleeve defining a cam follower, rotation of the axle and said first clutch sleeve causing said cam to move said spring means and said cam follower to ride up said ramp surface such that said first and second sets of teeth are cammed into meshing engagement and said cam follower rides on said flat surface, said stop member being engageable by said cam follower for rotation with said first clutch sleeve when said cam follower rides on said flat surface, rotation of said stop member moving said spring means.

9. A clutch for automatically engaging and disengaging a drive member and a driven member wherein the drive member is rotatable relative to a stationary housing, said clutch comprising a first clutch member disposed on the drive member for rotation therewith and movement relative thereto, said first clutch member having a first set of teeth, a second clutch member connected to the driven member for rotation therewith, said second clutch member having a second set of teeth, said first and second sets of teeth being adapted for meshing engagement when said first and second clutch members are in alignment, a rotatable cam member, said cam member defining at least one ramp surface and a flat surface, a rotatable stop member, spring means wrapped relative to said housing for developing friction drag, said spring means being engageable by said cam member and rotatable thereby in a wrapping direction tending to tighten said spring means and thereby develop a relatively high friction drag tending to retard rotation of said cam member, said spring means being engageable by said stop member and rotatable thereby in an unwrapping direction tending to loosen said spring means and thereby develop a relatively low friction drag tending to retard rotation of said stop member, and resilient means biasing said first clutch member out of alignment with said second clutch member, said first clutch member defining a cam follower, rotation of said drive member causing said cam follower to rotatably engage said cam member and drive said cam member into engagement with said spring means for rotation thereof in said wrapping direction, retarded rotation of said cam member causing said cam follower to ride up said ramp surface onto said flat surface and out of rotatable engagement with said cam member, thereby moving said first clutch member into alignment with said second clutch member, said cam follower being engageable with said stop member when on said flat surface for driving said stop member into engagement with said spring means for rotation thereof in said unwrapping direction, said cam member being engageable and driveable by said spring means upon rotation thereof in said unwrapping direction for rotation of said cam member with said spring means and said stop member.

10. A clutch for automatically engaging and disengaging rotatable drive and driven members wherein the drive member is supported for rotation relative to a stationary member, said clutch comprising first clutch means rotatable with and movable relative to said drive member, second clutch means rotatable with said driven member, said first and second clutch means respectively defining first and second sets of clutching elements adapted for engagement when said first and second clutch means are in alignment, annular cam means concentric with said drive member, said cam means defining a plurality of ramp surfaces and a flat surface, said cam means also defining first and second slots, annular stop means concentric with said cam means, said stop means defining a plurality of projections extending beyond said flat surface of said cam means, said stop means also defining a notch, said first clutch means defining cam follower means disposed to ride said ramp and flat surfaces of said cam means for camming movement of said first clutch means toward and away from alignment with said second clutch means, first spring means biasing said first clutch means away from alignment with said second clutch means, and second spring means wrapped around said stationary member, said second spring means having first and second end portions extending respectively through said first and second slots and into said notch.

11. The invention of claim 10, said first slot being at least partially defined by a first slot surface of said cam means, said second slot being at least partially defined by a second slot surface of said cam means, and said notch being at least partially defined by first and second notch surfaces of said stop means, rotation of said first clutch means in one direction causing said cam follower means to rotate said cam means in said one direction, said second spring means being wrapped around said stationary member such that rotation of said cam means in said one direction causes said first slot surface to abut said first end portion and rotate said second spring means in said one direction to thereby tighten said wrapping thereof and develop a relatively high friction drag tending to retard continued rotation of said cam means, retarded rotation of said cam means causing said cam follower means to ride up one of said ramp surfaces and onto said flat surface such that said first clutch means is cammed toward alignment with said second clutch means and such that said cam follower ceases to rotate said cam means and abuts one of said projections so as to rotate said stop means in said one direction, rotation of said stop means in said one direction causing said first notch surface to abut said second end portion and rotate said second spring means in said one direction to thereby loosen said wrapping thereof and develop a relatively low friction drag tending to retard continued rotation of said stop means, said rotation of said second spring means by said first notch surface causing said second end portion to abut said second slot surface and rotate said cam means in said one direction.

12. The invention of claim 11, said clutching elements being clutch teeth adapted for meshing engagement in drive and coast modes when said first and second clutch means are in alignment, said first and second clutch means being rotatable relatively between said drive and coast modes when said cam follower means is on said flat surface of said cam means.

13. The invention of claim 12, rotation of said first clutch means in the opposite direction when said first and second clutch means are in alignment developing sufficient windup in said first and second sets of clutch teeth to nullify the biasing force of said first spring means.

* * * * *